(12) United States Patent
James et al.

(10) Patent No.: US 11,433,490 B2
(45) Date of Patent: Sep. 6, 2022

(54) WELDING FOR ELECTRICAL TOOLS

(71) Applicant: Halliburton Energy Services, Inc., Houston, TX (US)

(72) Inventors: Paul Gregory James, Spring, TX (US); Ibrahim El Mallawany, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 433 days.

(21) Appl. No.: 16/620,010

(22) PCT Filed: Jan. 22, 2019

(86) PCT No.: PCT/US2019/014601
§ 371 (c)(1),
(2) Date: Dec. 6, 2019

(87) PCT Pub. No.: WO2020/153944
PCT Pub. Date: Jul. 30, 2020

(65) Prior Publication Data
US 2021/0323103 A1 Oct. 21, 2021

(51) Int. Cl.
*E21B 17/00* (2006.01)
*B23K 37/04* (2006.01)
(Continued)

(52) U.S. Cl.
CPC ........ *B23K 37/0426* (2013.01); *B23K 37/006* (2013.01); *E21B 17/003* (2013.01); *B23K 2101/20* (2018.08); *B23K 2101/38* (2018.08)

(58) Field of Classification Search
CPC .............. B23K 37/0426; B23K 37/006; B23K 2101/20; B23K 31/02; B23K 2101/32;
(Continued)

(56) References Cited

U.S. PATENT DOCUMENTS 4,627,490 A * 12/1986 Moore .................. E21B 33/047
174/665
5,706,892 A * 1/1998 Aeschbacher, Jr ... E21B 33/127
166/69

(Continued)

FOREIGN PATENT DOCUMENTS

KR 10-2012-0101770 A 9/2012
WO 2015-047586 A1 4/2015

OTHER PUBLICATIONS

International Search Report issued in PCT/US2019/014601, dated Oct. 21, 2019.

(Continued)

*Primary Examiner* — Kiley S Stoner
(74) *Attorney, Agent, or Firm* — Conley Rose, P.C.; Rodney B. Carroll

(57) ABSTRACT

A method includes removing a section of electrical insulation proximate an end of a tubing-encased conductor (TEC) to form an end of electrical insulation that is axially recessed relative to the end of the TEC. The method includes welding an end member to an outer surface of the outer tube at a weld joint that is axially between the end of the TEC and the end of the electrical insulation to protect the electrical insulation from heating damage from welding. The method includes replacing the section of electrical insulation proximate the end of the TEC by inserting a spacer into the end of the TEC between the outer tube and the electrical conductor after welding the end member to the outer surface of the TEC. A tool can be electrically connected to the electrical conductor and the tool can be welded to the end member.

20 Claims, 4 Drawing Sheets

(51) Int. Cl.
*B23K 37/00* (2006.01)
*B23K 101/20* (2006.01)
*B23K 101/38* (2006.01)

(58) Field of Classification Search
CPC ........ B23K 2101/36–38; E21B 17/003; G01K 7/16
See application file for complete search history.

(56) References Cited

U.S. PATENT DOCUMENTS

| | | | |
|---|---|---|---|
| 7,340,819 | B2 | 3/2008 | Guven et al. |
| 7,836,959 | B2 | 11/2010 | Howard et al. |
| 8,397,828 | B2 | 3/2013 | Hopmann et al. |
| 8,641,457 | B2 | 2/2014 | Watson et al. |
| 8,757,276 | B2 | 6/2014 | Alff et al. |
| 9,071,008 | B2 | 6/2015 | Zillinger et al. |
| 2004/0055746 | A1* | 3/2004 | Ross .................... B23K 3/0623 166/250.15 |
| 2007/0289779 | A1 | 12/2007 | Howard et al. |
| 2012/0073804 | A1* | 3/2012 | Harman ................ E21B 17/003 166/250.01 |
| 2015/0114095 | A1* | 4/2015 | Hatta ..................... F23Q 7/001 219/137 R |
| 2015/0323392 | A1* | 11/2015 | Mori ...................... B23K 31/02 374/165 |
| 2016/0123135 | A1* | 5/2016 | Leeflang ............... E21B 47/017 73/152.52 |
| 2020/0116009 | A1* | 4/2020 | Marcuccio ............. E21B 49/08 |
| 2021/0223113 | A1* | 7/2021 | Pecquet ................... G01K 1/14 |
| 2021/0247542 | A1* | 8/2021 | James ..................... H01Q 1/27 |

OTHER PUBLICATIONS

"Intellitite: Downhole dual-seal dry-mate connector"; Schlumberge, 2014, 1 page, www.slb.com/wellwatcher.

* cited by examiner

WELDING FOR ELECTRICAL TOOLS

CROSS REFERENCE TO RELATED APPLICATIONS

This application is a U.S. National Phase Application filed under 35 U.S.C. § 371, based on International PCT Patent Application No. PCT/US2019/014601, filed Jan. 22, 2019. The entire contents of this application is incorporated herein by reference in its entirety.

BACKGROUND OF THE INVENTION

1. Field of the Invention

The present disclosure relates to electrical tools such as sensors for pressure and temperature, and more particularly to welding electrical tools to tubing-encased conductors (TECs).

2. Description of Related Art

A tubing-encased conductor (TEC) for downhole tools typically includes a conductor running through a metal tubing with electrical insulation layered between the conductor and the tubing to prevent short circuits between the tubing and the conductor. This arrangement can provide the robust protection for the conductor that is needed for the harsh conditions possible in downhole applications.

It is desirable to weld certain electrical tools, e.g., sensors for downhole pressure and temperature, directly to the outer tubing of the TEC. This allows the connections to be performed in a shop to avoid time consuming connections done on a rig floor. However, welding directly on a TEC runs the risk that heat from the welding can burn and/or damage the insulation material inside the TEC. If the insulation near the weld is removed prior to welding, this can avoid heat damaging the insulation, but the conductor can short circuit by contact with the outer tube of the TEC in the uninsulated length of the TEC, for example if the conductor expands and buckles due to temperature effects.

The conventional techniques have been considered satisfactory for their intended purpose. However, there is an ever present need for improved joining of electrical tools to TECs. This disclosure provides a solution for this need.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
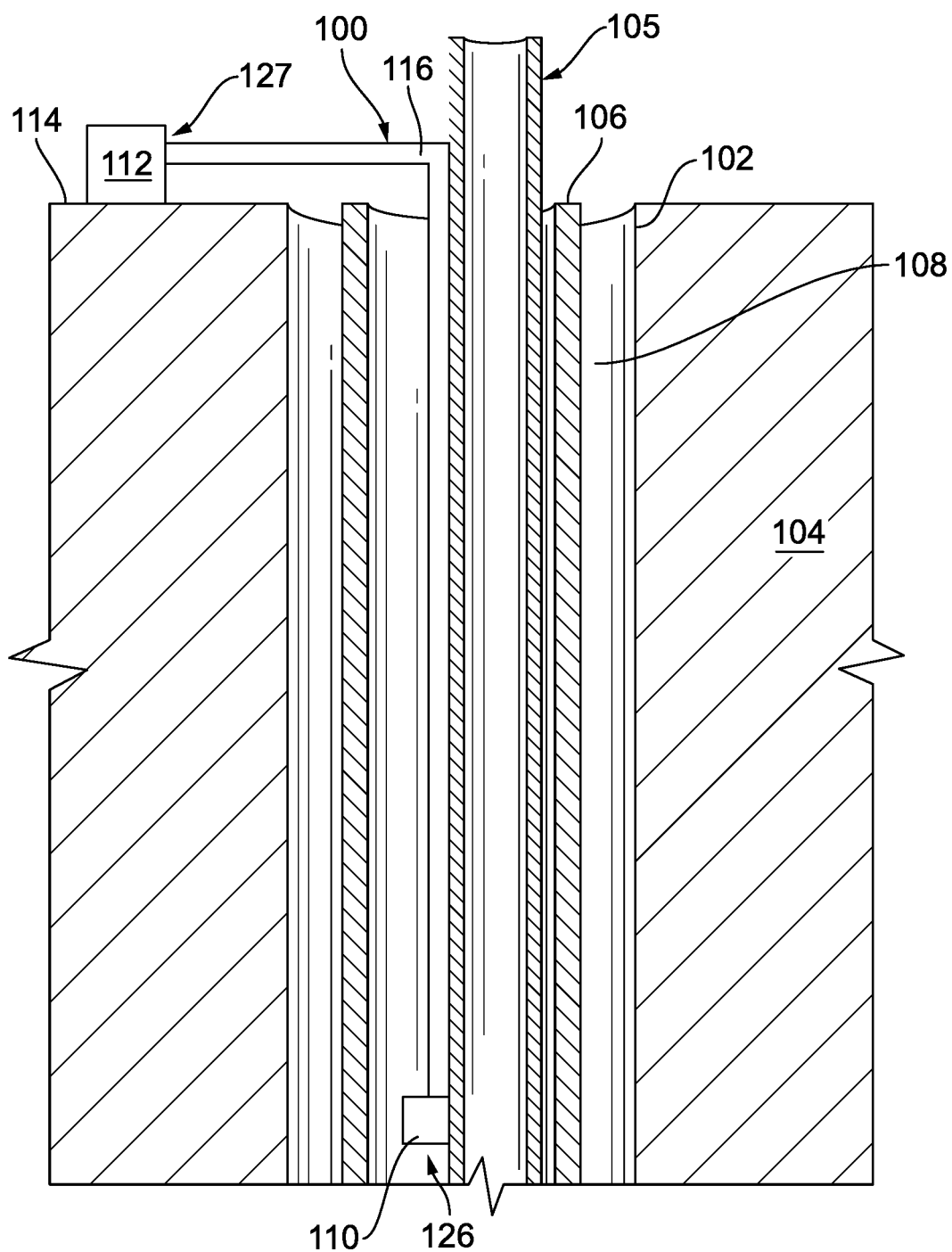
FIG. 1 is a schematic side elevation view of an exemplary embodiment of an assembly constructed in accordance with the present disclosure, showing the tubing-encased conductor (TEC) with an electrical tool joined to one end thereof in a wellbore for downhole use.

Reference will now be made to the drawings wherein like reference numerals identify similar structural features or aspects of the subject disclosure. For purposes of explanation and illustration, and not limitation, a partial view of an exemplary embodiment of an assembly in accordance with the disclosure is shown in FIG. 1 and is designated generally by reference character 100. Other embodiments of assemblies in accordance with the disclosure, or aspects thereof, are provided in FIGS. 2-4, as will be described. The systems and methods described herein can be used to join electrical tools to tubing-encased conductors (TECs), for example in downhole applications.

In a wellbore 102 through an earth formation 104, a casing 106 can be positioned in the wellbore with an annulus 108 between the casing 106 and the formation 104. Downhole tools can be passed into the wellbore 102 through the casing 106, and production fluids, such as oil and gas, can be conveyed to the surface within the casing 106. The assembly 100 can be used to provide power and/or communication between an electrical tool 110 and a system 112 at the surface 114 of the earth formation 104. The assembly 100 includes a tubing-encased conductor (TEC) 116, which can be run for example with production tubing 105 down the casing 106.

Figure 2:
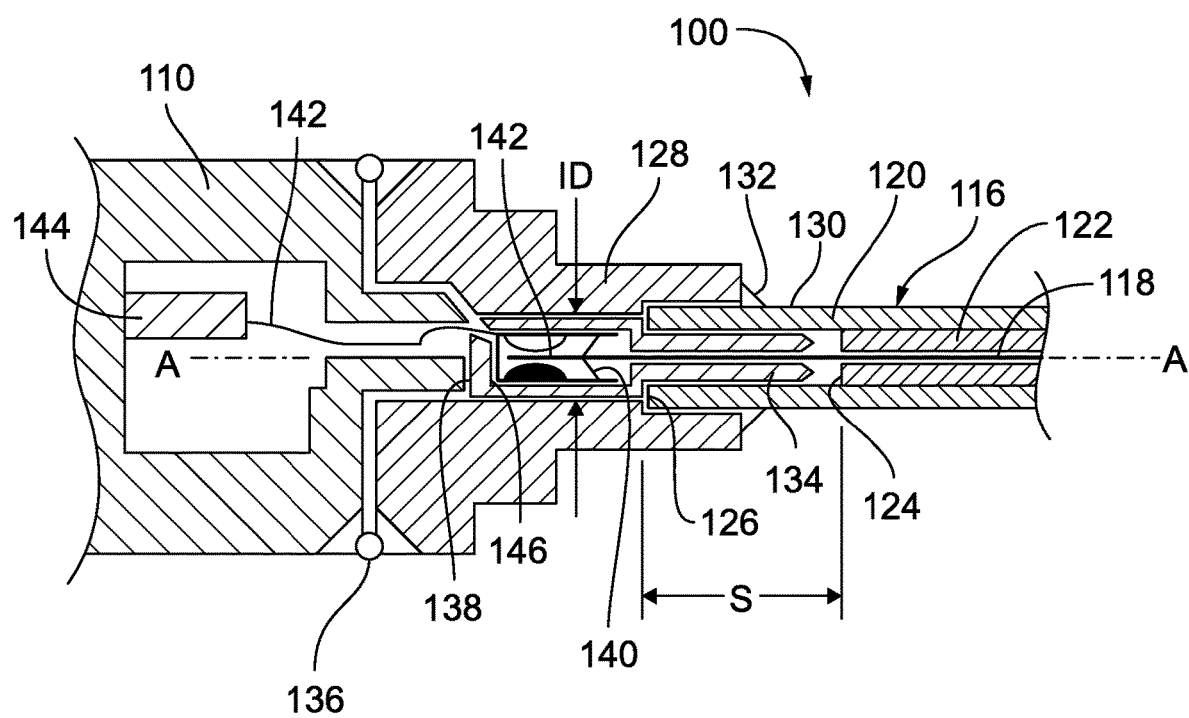
FIG. 2 is a schematic cross-sectional side elevation view of a portion of the assembly of FIG. 1, showing the spacer inserted in an end of the TEC.

With reference now to FIG. 2, the TEC 116 includes an electrical conductor 118 running axially, i.e. in the direction along axis A, within an outer tube 120 with electrical insulation 122 layered radially between the electrical conductor 118 and the outer tube 120. The electrical insulation 122 has an end 124 that is axially recessed relative to an end 126 of the TEC 116, which is the end of the outer tube 120. The end 124 of the electrical insulation 112 is recessed inward from the end 126 of the outer tube 120 by a span S, which represents a portion of the electrical insulation 122 proximate the end 126 of the TEC 116 that is removed from the TEC 116 in preparation to join the electrical tool 110 to the TEC 116. After removal of the span S of the electrical insulation 122, an end member 128 is welded to an outer surface 130 of the outer tube 120 at a weld joint 132 that is axially between the end 126 of the TEC 116 and the end 124 of the electrical insulation 122. Removal of the span S of the electrical insulation 122 from the end 126 of the TEC 116 protects the electrical insulation 122 that remains from damage that would otherwise result to the electrical insulation 122 from the heat of welding the weld joint 132.

After the weld joint 132 cools, a spacer 134 is inserted in the end 126 of the TEC 116 between the outer tube 120 and the electrical insulator 122. The spacer 134 includes an electrical insulator material, and replaces the span S of the electrical insulator 122 that was removed prior to forming the weld joint 132. The end member 128 has an inner diameter ID large enough to allow the spacer 134 to slide and connect to the electrical conductor 118 as well and insulate the cored out area of the electrical insulator 122 represented by span S. The spacer 134 prevents the conductor 118 from short circuiting against the outer tube 120, e.g., in the event that thermal expansion/contraction buckles the conductor 118.

With the end member 128 joined to the TEC 116, a tool 110 can be electrically connected to the electrical conductor 118 and the tool 110 can be welded to the end member 128. The tool 110 can include a temperature sensor, a pressure sensor, any other sensor to measure a wellbore parameter or property, and/or any other suitable electrical component or components. In FIG. 1, the tool 110 is welded to the end member 128 at weld joint 136 at a position that is distal, i.e. left in FIG. 2, from the end 126 of the TEC 116 and from a distal end 138 of the spacer 134, so the high temperatures of welding the weld joint 136 do not damage the electrical insulation 122 or the spacer 134. While shown in FIG. 1 external to the interior of production tubing 105, those skilled in the art will readily appreciate that the tool 110 can be ported to the tubing without departing from the scope of this disclosure.

The spacer 134 includes an angled trap 140 configured to secure an end 142 of the electrical conductor 118 within the spacer 134, where it is more difficult to slide the electrical conductor 118 out of the angled trap 140 than it is to slide the electrical conductor 118 into the angled trap 140. The angled trap 140 includes an electrically conductive material with an electrical lead 142 extending out of the spacer 134 for electrically connecting the electrical conductor 118 of the TEC 116 to the electrical tool 110, e.g. connecting the electrical component 144 of the electrical tool 110 to receive power and/or communicate via the electrical conductor 118. The angled trap 140 can include a metallic end plate 146 positioned to prevent the end 142 of the electrical conductor 118 from puncturing the spacer 134.

Figure 3:
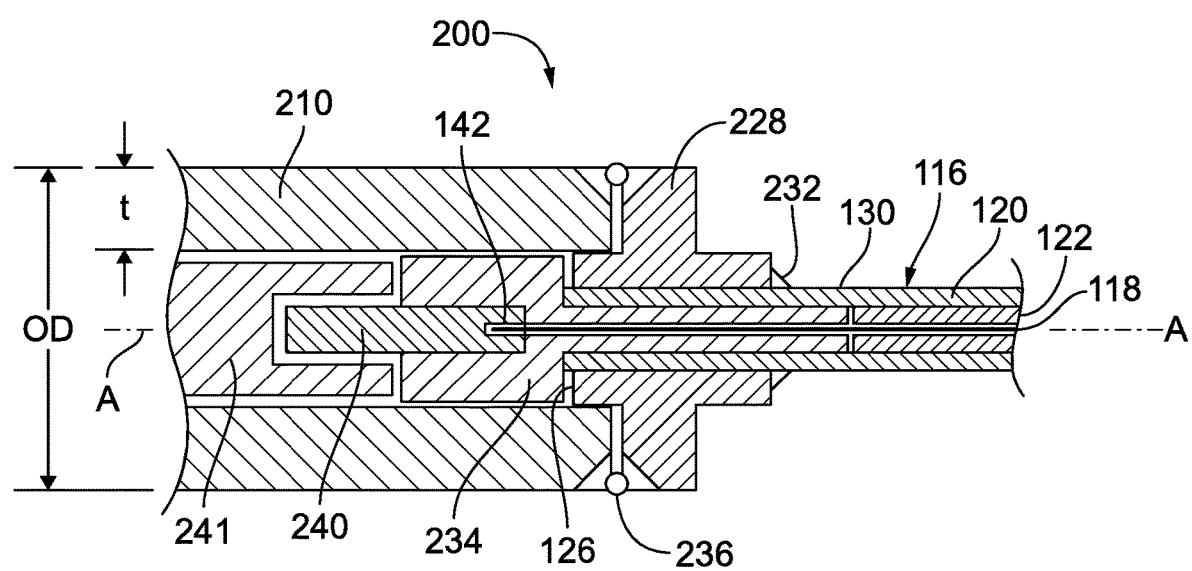
FIG. 3 is a schematic cross-sectional side elevation view of a portion of another exemplary embodiment of an assembly in accordance with the present disclosure, showing an electrical pin connection between the electrical tool and the conductor of the TEC.

With reference now to FIG. 3, another exemplary embodiment of an assembly 200 is shown which includes a TEC 116 as described above with an end member 228 welded at a weld joint 232 much as described above with respect to FIG. 1. A spacer 234 includes a pin connector 240 that is crimped and/or soldered to the end 142 of the electrical conductor 118. An electrical tool 210 is welded to the end member 228. A mating pin connector 241 can be preassembled into the tool 210 before welding, wherein the pin connectors 240 and 241 of the tool and spacer are electrically connected to each other when the tool 210 is welded to the end member 228. The tool 210 is welded to the end member 228 at a weld joint 236 that is proximal, i.e. to the right in FIG. 3, relative to at least a portion of the spacer 234, and proximal relative to the end 126 of the TEC 116. If the tool 210 has a large enough outer diameter OD and/or thickness t, welding the weld joint 236 radially outboard of the spacer 234 does not damage the spacer 234. The end member 228 can be axially short enough to allow easy access to the end 142 of the electrical conductor 118 during the assembly process.

Figure 4:
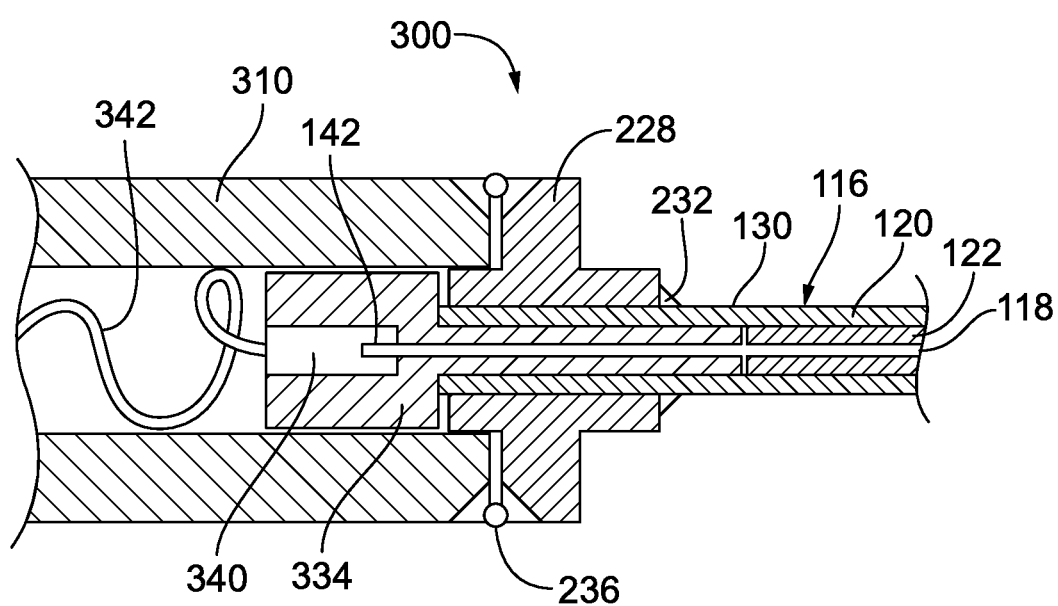
FIG. 4 is a schematic cross-sectional side elevation view of a portion of another exemplary embodiment of an assembly in accordance with the present disclosure, showing a wire for connecting the conductor of the TEC to the electrical tool.

With reference now to FIG. 4, another exemplary embodiment of an assembly 300 is shown which includes a TEC 116 with an end member 228 welded at a weld joint 232 much as described above with respect to FIG. 3. A spacer 334 includes a connector 340 electrically connected to an end 142 of the electrical conductor 118 of the TEC 116 by at least one of crimping, welding, brazing and/or soldering. A wire 342 electrically connects an electrical tool 310 to the connector 340. The locations of the weld joints 232 and 236 are the same in FIG. 4 as described above with respect to FIG. 3.

While FIGS. 2-4 show a single end 126 of the TEC 116 being connected to a tool 110, 210 or 310, those skilled in the art will readily appreciate that the opposite end 127 of the TEC 116 (shown in FIG. 1) can be connected using an end member, e.g., end member 128 or 228, using the same techniques described above for connection of the TEC 116 to the system 112 or any other suitable component that needs to connect to a tool, e.g. tool 110. Systems and methods described herein enable welding tools to TECs in a shop without damaging the electrical insulation of the TEC, so that assembly need not take place on a rig floor. Systems and methods described herein allow for connecting electrical tools to TECs with protection against the electrical conductor buckling under thermal expansion/contraction and short circuiting through contact with the outer tube of the TEC.

Accordingly, as set forth above, the embodiments disclosed herein may be implemented in a number of ways. For example, in general, in one aspect, the disclosed embodiments relate to a method. The method includes removing a section of electrical insulation proximate an end of a tubing-encased conductor (TEC), wherein the TEC includes an electrical conductor running axially within an outer tube with the electrical insulation layered radially between the electrical conductor and the outer tube, to form an end of the electrical insulation that is axially recessed relative to the end of the TEC. The method includes welding an end member to an outer surface of the outer tube at a weld joint that is axially between the end of the TEC and the end of the electrical insulation to protect the electrical insulation from heating damage from welding. The method includes replacing the section of electrical insulation proximate the end of the TEC by inserting a spacer into the end of the TEC between the outer tube and the electrical conductor after welding the end member to the outer surface of the TEC, wherein the spacer includes an electrically insulative material.

In general, in another aspect, the disclosed embodiments relate to an assembly. The assembly includes a tubing-encased conductor (TEC), wherein the TEC includes an electrical conductor running axially within an outer tube with electrical insulation layered radially between the electrical conductor and the outer tube, wherein the electrical insulation has an end that is axially recessed relative to an end of the TEC. An end member is joined to an outer surface of the outer tube at a weld joint that is axially between the end of the TEC and the end of the electrical insulation. A spacer is included in the end of the TEC between the outer tube and the electrical conductor.

In accordance with any of the foregoing embodiments, a tool can be electrically connected to the electrical conductor and the tool can be welded to the end member. Welding the tool to the end member can include welding the tool to the end member at a position that is distal from the end of the TEC. Welding the tool to the end member can include welding the tool to the end member at a position that is distal from an end of the spacer.

In accordance with any of the foregoing embodiments the spacer can include an angled trap configured to secure an end of the electrical conductor within the spacer, wherein the angled trap includes an electrically conductive material with an electrical lead extending out of the spacer for connecting the electrical conductor of the TEC to an electrical tool. The angled trap can include a metallic end plate positioned to prevent the end of the electrical conductor from puncturing the spacer.

In another aspect, the spacer can include a pin connector connected to an end of the electrical conductor of the TEC by at least one of crimping, welding, brazing, and/or soldering. An electrical tool can be welded to the end member, wherein welding the tool to the end member includes welding the tool to the end member at a weld joint that is proximal relative to at least a portion of the spacer. The tool can be welded to the end member at a weld joint that is proximal relative to the end of the TEC. A pin connector can be preassembled into the tool, wherein the pin connectors of the tool and spacer are electrically connected to each other.

In another aspect, the spacer can include a connector electrically connected to an end of the electrical conductor of the TEC by at least one of crimping, welding, brazing, and/or soldering, wherein a wire electrically connects an electrical tool to the connector.

In accordance with any of the foregoing embodiments, the tool can include at least one of a temperature sensor, a pressure sensor, and/or other sensor to measure a wellbore parameter or property.

The methods and systems of the present disclosure, as described above and shown in the drawings, provide for welding electrical tools to tube-encased conductors with superior properties including improved separation between the conductor and the outer tubing even in conditions where changes in temperature affect the conductor. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   removing a section of electrical insulation proximate an end of a tubing-encased conductor (TEC), wherein the TEC includes an electrical conductor running axially within an outer tube with the electrical insulation layered radially between the electrical conductor and the outer tube, to form an end of the electrical insulation that is axially recessed relative to the end of the TEC;
   welding an end member to an outer surface of the outer tube at a weld joint that is axially between the end of the TEC and the end of the electrical insulation to protect the electrical insulation from heating damage from welding; and
   replacing the section of electrical insulation proximate the end of the TEC by inserting a spacer that has a first end and a second end into the end of the TEC between the outer tube and the electrical conductor such that the first end is adjacent axially to the remaining electrical insulation and such that the second end of the spacer extends axially beyond the end of the TEC and encases the end of the electrical conductor after welding the end member to the outer surface of the TEC, wherein the spacer includes an electrically insulative material.

2. The method as recited in claim 1, wherein the spacer includes an angled trap configured to secure an end of the electrical conductor within the spacer, wherein the angled trap includes an electrically conductive material with an electrical lead extending out of the spacer for connecting the electrical conductor of the TEC to an electrical tool.

3. The method as recited in claim 2, further comprising:
   electrically connecting the tool to the electrical conductor; and
   welding the tool to the end member.

4. The method as recited in claim 3, wherein welding the tool to the end member includes welding the tool to the end member at a position that is distal from the end of the TEC.

5. The method as recited in claim 3, wherein welding the tool to the end member includes welding the tool to the end member at a position that is distal from an end of the spacer.

6. The method as recited in claim 1, wherein the spacer includes a pin connector connected to an end of the electrical conductor of the TEC by at least one of crimping, welding, brazing, and/or soldering.

7. The method as recited in claim 6, further comprising welding an electrical tool to the end member, wherein welding the tool to the end member includes welding the tool to the end member at a weld joint that is proximal relative to at least a portion of the spacer.

8. The method as recited in claim 6, wherein welding the tool to the end member includes welding the tool to the end member at a weld joint that is proximal relative to the end of the TEC.

9. An assembly comprising:
   a tubing-encased conductor (TEC), wherein the TEC includes an electrical conductor running axially within an outer tube with electrical insulation layered radially between the electrical conductor and the outer tube, wherein the electrical insulation has an end that is axially recessed relative to an end of the TEC;
   an end member joined to an outer surface of the outer tube at a weld joint that is axially between the end of the TEC and the end of the electrical insulation; and
   a spacer in the end of the TEC between the outer tube and the electrical conductor, wherein the spacer has a first end and a second end and includes an electrical insulator material, and the first end of the spacer is adjacent to the axially recessed electrical insulation and the second end of the spacer extends axially beyond the end of the TEC such that the end of the electrical conductor is encased by the spacer.

10. The assembly as recited in claim 9, wherein the spacer includes an angled trap configured to secure an end of the electrical conductor within the spacer, wherein the angled trap includes an electrically conductive material with an electrical lead extending out of the spacer for connecting the electrical conductor of the TEC to an electrical tool.

11. The assembly as recited in any of claim 9, wherein the angled trap includes a metallic end plate positioned to prevent the end of the electrical conductor from puncturing the spacer.

12. The assembly as recited in claim 10, wherein the tool is joined to the end member at a weld joint, and wherein the tool is electrically connected to the electrical conductor.

13. The assembly as recited in claim 12, wherein the weld joint is at a position that is distal from the end of the TEC.

14. The assembly as recited in claim 12, wherein the weld joint is at a position that is distal from an end of the spacer.

15. The assembly as recited in claim 9, wherein the spacer includes a pin connector connected to an end of the electrical conductor of the TEC by at least one of crimping, welding, brazing, and/or soldering.

16. The assembly as recited in claim 15, further comprising an electrical tool joined to the end member at a weld joint that is proximal relative to at least a portion of the spacer.

17. The assembly as recited in claim 15, further comprising an electrical tool joined to the end member at a weld joint that is proximal relative to the end of the TEC.

18. The assembly as recited in claim 16, wherein the tool includes a pin connector preassembled into the tool, wherein the pin connectors of the tool and spacer are electrically connected to each other.

19. The assembly as recited in claim 9, wherein the spacer includes a connector electrically connected to an end of the electrical conductor of the TEC by at least one of crimping, welding, brazing, and/or soldering, wherein a wire electrically connects an electrical tool to the connector.

20. The assembly as recited in claim 10, wherein the tool includes at least one of a temperature sensor, a pressure sensor, and/or other sensor to measure a wellbore parameter or property.

* * * * *